(No Model.)
N. D. METZ.
SEEDER AND PLANTER.
No. 417,930. Patented Dec. 24, 1889.
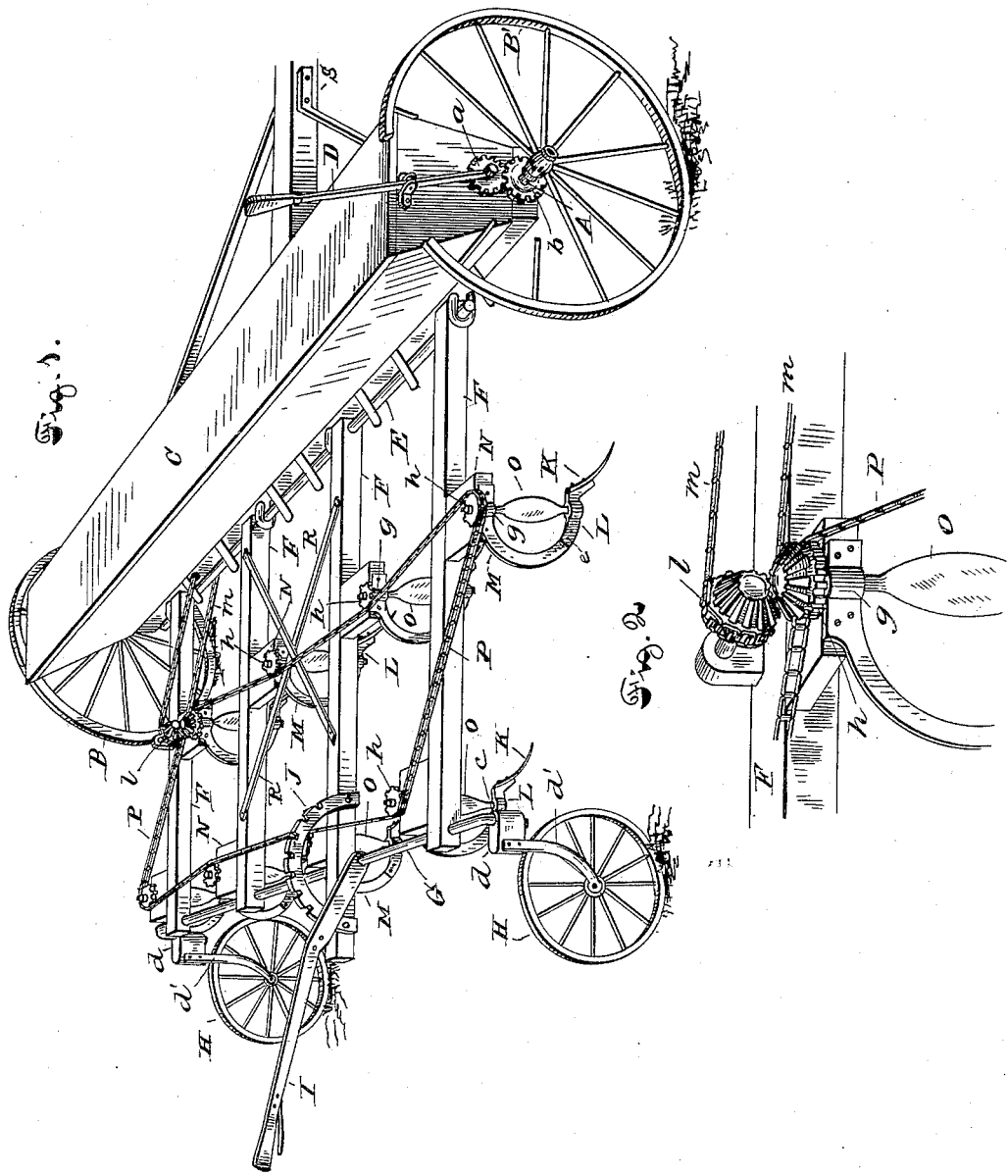
Witnesses
H. D. Nealy.
N. H. Patterson
Inventor
Nelson D. Metz
By his Attorneys
A. H. Evans & Co.

UNITED STATES PATENT OFFICE.

NELSON D. METZ, OF HUDSON, IOWA.

SEEDER AND PLANTER.

SPECIFICATION forming part of Letters Patent No. 417,930, dated December 24, 1889.

Application filed August 14, 1889. Serial No. 320,673. (No model.)

*To all whom it may concern:*

Be it known that I, NELSON D. METZ, a citizen of the United States, residing at Hudson, in the county of Black Hawk and State of Iowa, have invented certain new and useful Improvements in Seeders and Planters, of which the following is a full and clear description, reference being had to the accompanying drawings, forming part of this specification, in which—

Figure 1 represents a perspective view of a seeding and planting machine constructed according to my invention. Fig. 2 is a detail to be referred to.

My invention relates to certain new and useful improvements in seeders and planters, and especially in a means for keeping the standards of the shovels or plows clear of weeds, cornstalks, and other rubbish; and my invention consists in the constructions and combinations of devices which I shall hereinafter fully describe and claim.

To enable others skilled in the art to make and use my invention, I will now describe its construction and indicate the manner in which I carry the same out.

Referring to the drawings, A indicates the main axle, B B' the bearing-wheels thereon, and C the seed-box, which may be of any well-known construction, it being provided with appropriate means for dropping the seed in any usual manner, not herein necessary to show; but the shaft of the seed-roller projects through one end of the box and is provided with a gear-wheel $a$, which has a collar engaged by a lever D, whereby said gear may be moved longitudinally on the shaft to engage and disengage a gear-wheel $b$ on the main axle, whereby the power of the main wheel is transmitted to the seed-roller or removed therefrom, as desired, the said gear $a$ being splined to the seed-roller shaft, or being slotted and held by a pin to insure a free sliding movement when the lever D is operated.

Just in rear of the seed-box is mounted a shaft E, upon which the forward ends of the beams F are pivotally mounted, the rear ends of said beams being also hung upon a rod or shaft G, whose outer ends project through the outer beams F and are formed with pintles $c$, upon which the heads $d$ of the standards $d'$ turn, the said standards carrying at their lower ends any well-known form of caster-wheels H, which support the rear end of the machine and regulate the height of the shovels or plows, as I shall hereinafter indicate.

On the rear shaft G is keyed or otherwise secured a lever I, which may carry the usual form of spring-actuated pawl, adapted to engage notches in the segment or arched rack-bar J, secured to one of the beams F, whereby when the lever is lowered, as shown in Fig. 1, the caster wheels H ride forward and elevate the beams and their attached plows, so that the latter may be raised above the ground, as when going on or off the field, and when said lever is raised the caster-wheels ride backward to permit the rear ends of the beams to lower and their plows or shovels to penetrate the ground a depth which is controlled by the movement and adjustment of the lever.

The shovels or plows K may be of any well-known form, and they are bolted to castings L, to which the lower end of the shovel-standards M are secured by break-pins $e$ or other means, the said standards having their upper ends passed through or into blocks N, bolted to the sides of the beams F near their rear ends.

To prevent the accumulation of weeds, cornstalks, and other rubbish about the standards of the shovels or plows, I employ a series of rotary clearers, one being placed immediately in front of each standard and the series being operated by an endless belt, which is driven by power derived from one of the main wheels, as I will now set forth. These clearers consist each of a vertically-placed rod O, flattened at its center and having its ends pivotally mounted, the lower end being seated in the casting L, which carries the shovel, and its upper portion being mounted in a bearing $g$, while upon the upper end of said rod is fitted a sprocket-wheel $h$, which is engaged and driven by the endless chain P, which engages and drives in unison all the sprocket-wheels, thereby turning all the clearers and throwing from the shovel-standards the weeds and rubbish which usually accumulate about them. The upper face of one of the sprocket-wheels $h$, preferably the one nearest the left-hand main bearing-wheel, is formed with beveled teeth, which are adapted for engagement with similar teeth on a horizontally-placed sprocket-wheel *l*, which is connected with and driven by a chain *m*, running from a sprocket-wheel on the shaft or axis of the bearing-wheels.

From this construction it will be seen that when the machine is started the motion of the bearing-wheels is communicated to the chain *m*, and from thence through the intermediate gearing to the chain P, which engages the sprocket-wheels *h* and operates them to rotate the clearers.

A machine constructed as shown is designed for plowing four furrows at one time, the two middle series of plows operating upon opposite sides of a hill or row of corn or other grain, while the shovels at the opposite sides of the machine form their furrows on the inner sides of the next adjacent hills or rows.

R represents diagonally-arranged plates for bracing the middle beams, and S is the tongue or pole, which is coupled to the machine in any well-known manner.

Having thus described my invention, what I claim as new, and desire to secure by Letters Patent is—

1. The combination, with a seeder and planter, of the beams F, carrying the shovel-standards, and clearers in front of said standards, each clearer consisting of a vertical rod flattened at its central portion and having its ends mounted in bearings, whereby it may revolve, a sprocket-wheel carried by the upper end of said rod, an endless chain engaging the sprocket-wheels, and a second chain connected with the axis of the main bearing-wheels and imparting motion to the endless chain, substantially as described.

2. The combination, with a seeder and planter and the plows and standards thereof, of the axially-movable clearers flattened at their central portions and each provided with a sprocket-wheel, an endless chain for driving said sprocket-wheels, whereby the clearers rotate, a second chain operated by the travel of the machine, and the combined sprocket and bevel gearing for transmitting the power of said second chain to the endless chain to operate the clearers, substantially as described.

NELSON D. METZ.

Witnesses:
ANNA METZ,
J. M. WALKER.